Patented May 12, 1931

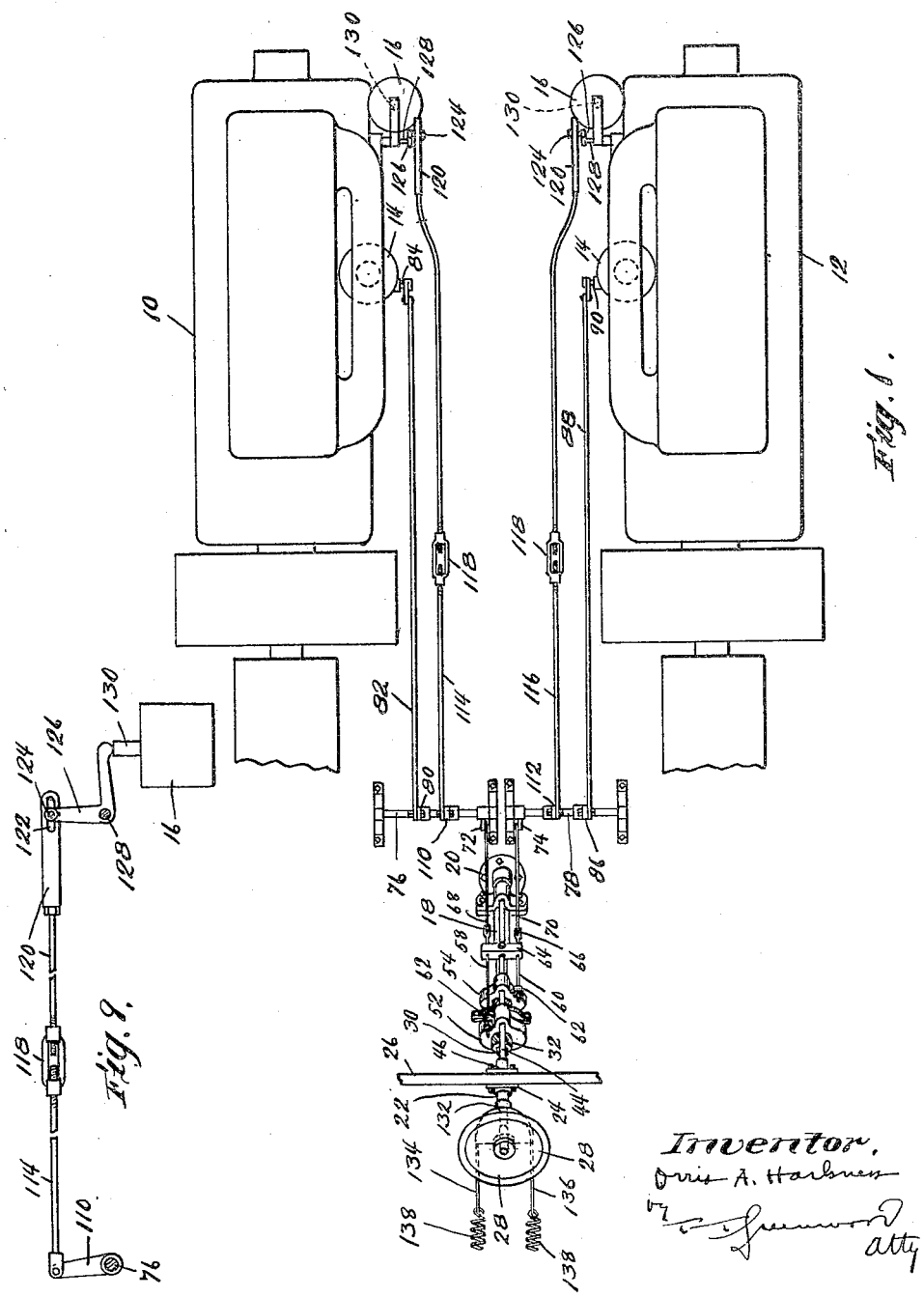

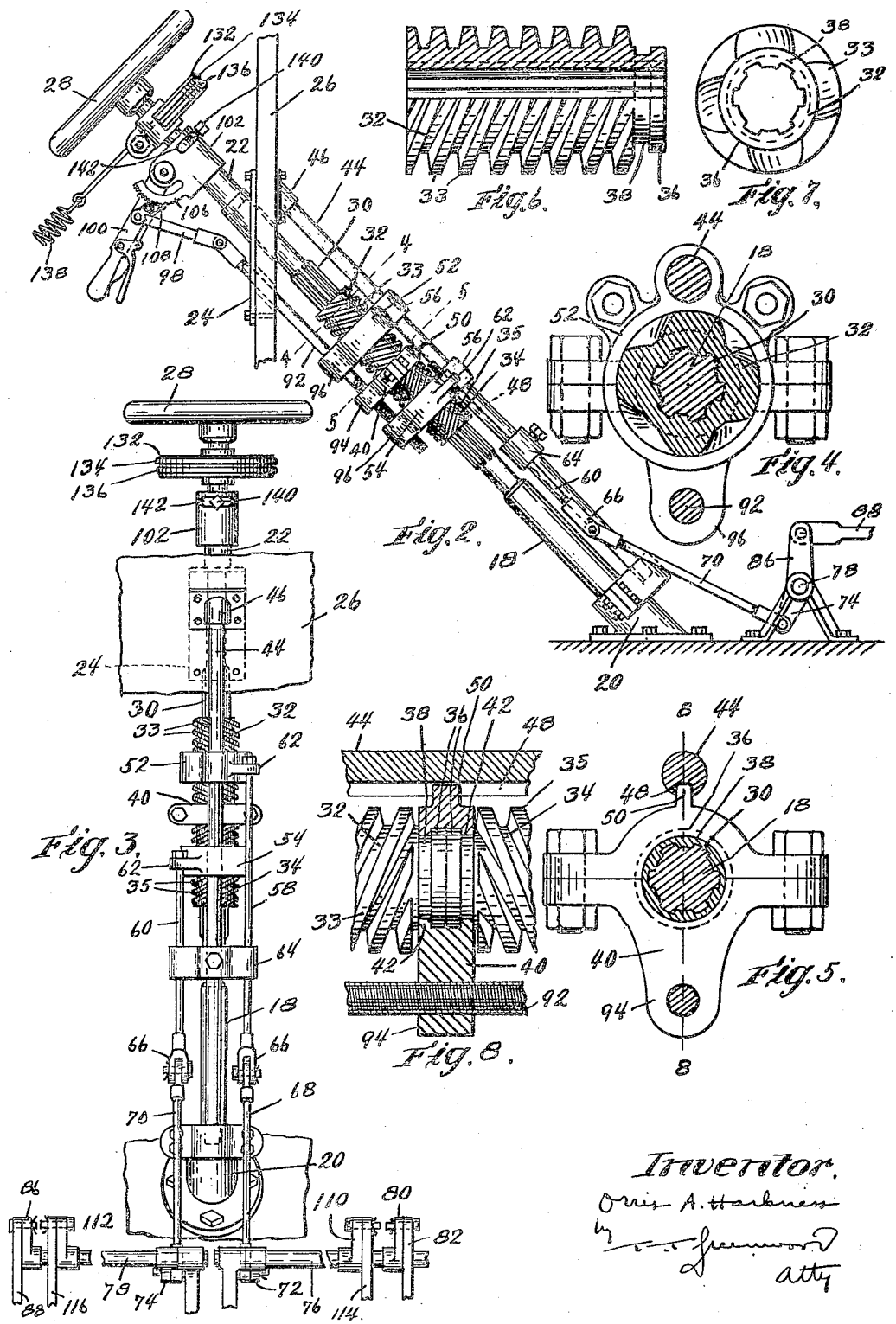

1,805,141

UNITED STATES PATENT OFFICE

ORRIS A. HARKNESS, OF VEAZIE, MAINE, ASSIGNOR TO GREAT NORTHERN PAPER COMPANY, OF MILLINOCKET, MAINE, A CORPORATION OF MAINE

STEERING MECHANISM FOR TWIN ENGINE TRACTORS

Application filed May 28, 1928. Serial No. 281,033.

This invention relates to steering mechanisms for tractors and the like self-propelled vehicles.

One type of tractor is driven by twin engines which are each connected independently through its own clutch and speed reduction gearing with the driving wheel or tread on one side of the tractor. The driving wheels or treads, and the engines, are mechanically independent. The tractor is steered or directed to the right and to the left by varying the relative speeds of the engines so that one driving wheel or tread moves at a faster rate than the other and the tractor thus turns toward the side of the slowest driven tread. For straight-ahead driving, both engines are set to rotate at the same speed.

An object of the present invention is the provision of a steering mechanism for a tractor of the type above set forth that is arranged to control the relative speeds of the engines in a simple and effective manner.

A further object of the invention is the provision of a steering mechanism by which the relative speeds of the engines can be varied in opposite directions for turning purposes, combined with an engine throttle by which the speeds of both engines can be varied in the same direction and to the same extent regardless of the setting of the steering mechanism, thus to obtain increased power in a turn without changing the direction of movement of the tractor.

The steering mechanism embodying this invention is arranged to decrease the throttle opening of one engine and increase the throttle opening of the other engine in turning the tractor. Thus, the power output of one engine is diminished. The engines are provided with speed governors which normally limit the maximum speed of the engine and it is a further object of this invention to provide a combined steering and throttle mechanism with means to disable the speed governors of the engines and thus permit the engines to rotate at a faster rate and deliver more power in making a turn.

A further object of the invention is generally to improve the construction of engine-speed-controlling steering mechanisms for twin engine tractors.

Fig. 1 is a plan view showing the relation between the twin engines of a tractor and the steering mechanism embodying this invention.

Fig. 2 is a side elevation of the steering mechanism.

Fig. 3 is a plan view of the steering mechanism of Fig. 2.

Fig. 4 is a section along line 4—4 of Fig. 2.

Fig. 5 is a section along line 5—5 of Fig. 2.

Fig. 6 is a side elevation partly in section of one of the worms of the steering mechanism.

Fig. 7 is an end view of the worm of Fig. 6.

Fig. 8 is a sectional view taken along line 8—8 of Fig. 5.

Fig. 9 is a detail illustrating the connections between the steering mechanism and the speed governor of one of the engines of the tractor.

As shown in Fig. 1, the engines 10 and 12 of the tractor are of the internal combustion type and are mounted side by side and each is adapted to drive a separate one of the driving wheels or endless belt treads of the tractor. Each engine and its driving tread is free from driving connection with the other engine and tread.

Each engine has its own carburetter 14 and a speed governor 16 which holds the speed of the engine down to a speed for which the governor is set. The steering mechanism is adapted to control the extents of openings of the throttle valves of the carburetters 14 and to increase the opening of one and to decrease the opening of the other throttle valve so that the tractor will be caused to turn either to the right or to the left as the case may be.

The steering mechanism includes an inclined steering shaft 18 which is rotatably supported at the bottom in a floor bracket 20 and at the top in a bushing 22 carried by a plate 24 fixed to the dash board or other support 26, and has a steering wheel 28 at its upper end. The shaft is provided with a plurality of splines 30 intermediate its ends on which worms 32 and 34 are slidably received. One worm 34 is provided with right hand screws 35 and the other with left hand screw threads 33. Both worms are provided with reduced ends 36 in the outer face of each of which a continuous peripheral groove 38 is formed. The reduced ends of both worms are disposed in abutting relation and are retained in such relation by a split collar 40, see Figs. 2 and 8, which encircles the reduced ends of both worms and has inwardly directed annular flanges 42 which are received loosely in the groves 38 of the worms so that the worms can rotate within the collar while being maintained in the aforesaid relation.

A stationary guide shaft 44 is located above and in parallel relation with the steering shaft 18 and is fixed in the floor bracket 20 at its lower end and in the bracket 46 at its upper end which bracket is attached to the dash board 26. An axial groove 48 is formed in the under side of said guide shaft and a projection 50 of said collar 40 is slidable therein. The guide shaft thus prevents the collar 40 from rotating while permitting it to move axially of the steering shaft. Internally right and left handed screw threaded nuts 52 and 54 are screw threaded on the worms 32 and 34, respectively, and have ears 56 through which the guide shaft 44 is passed loosely. The nuts are thus held by the guide shaft against rotation while they are free for movement axially of the steering shaft under the action of the worms when the worms are rotated by the steering shaft. Throttle rods 58 and 60 are fixed in ears 62 of the nuts 52 and 54 respectively, and are extended downwardly above and in parallel relation with the shaft 18. The rods intermediate their ends are slidable within a support 64 which is fixed to the guide shaft 44. The lower ends of said rods are pivotally connected by yokes 66 to links 68 and 70, respectively, the lower ends of which yokes are pivoted to depending arms 72 and 74 which are fixed to parallel and oppositely extended shafts 76 and 78, respectively.

The shaft 76 has an upstanding arm 80 fixed thereto to which a rod or link 82 is pivoted. Said link 82 extends forwardly of the steering mechanism and is pivotally connected with the throttle 84 of the left hand engine 10. The shaft 78 has a similar upstanding arm 86 fixed thereto to which a rod or link 88 is pivotally connected and said link extends to and is pivotally connected with the throttle 90 of the right hand engine.

With the arrangement so far described it is apparent that as the steering shaft 18 is turned to the left, Fig. 2, the worms 32 and 34 carried thereby will operate to force the nuts 52 and 54 apart, thus moving up the rod 58 and moving down the rod 60. The motion of these rods is transmitted to the shafts 76 and 78 to move the link 82 of the left hand engine forwardly to decrease the opening of the throttle thereof and to move the link 88 of the right hand engine rearwardly to increase the opening of the throttle thereof. The speed of the left hand engine is thus reduced and the speed of the right hand engine is increased. Consequently, the tractor will turn to the left. When the steering shaft is rotated in the opposite direction, or to the right, the nuts 52 and 54 will be moved inwardly by their respective worms so that the left hand engine will then be caused to speed up and the right hand engine to slow down, thus to turn the tractor toward the right. The sharpness of the turn is governed by the difference in engine speeds, or throttle openings.

Throttle mechanism is associated with the above described steering mechanism and is so arranged that the extent of opening of both throttles can be increased and decreased simultaneously regardless of the operation of the steering mechanism. The steering mechanism is also so arranged that it can effect a change in the relative settings of the throttles regardless of the operation of the throttle mechanism. Thus, the speed of the tractor can be controlled while making a turn. The throttle mechanism includes a rod 92 that is fixed in an ear 94 of the split collar 40 and is loosely extended through and is guided in ears 96 of the nuts 52 and 54. Said shaft 92 is parallel with and is disposed below the steering shaft 18 and extends upwardly and through and has a bearing in the dash plate 24.

A link 98 is pivotally connected with the upper end of said rod and also with a throttle arm and lever 100. Said arm is pivoted to a bracket 102 carried by the bushing 22 of the dash plate 24 and is operable over a toothed sector 106 and can be held releasably in any set position by a pawl 108 which is in spring-pressed releasable engagement with the teeth of said sector.

The above arrangement is such that by reciprocating the throttle arm 100, the collar 40 is caused to slide the worms 32 and 34 up and down the steering shaft 18. The nuts 52 and 54 of said worms are thus also caused to move up and down the shaft both conjointly with each other without changing their positions with respect to each other. Such movement of the worms causes the throttles of both engines to be moved in the same direction by the same amount, thus to increase and decrease the speeds of both engines by equal amounts. Such simultaneous and equal adjustments of both throttles is effected regardless of any rotation of the steering shaft; and the nuts 52 and 54 can be moved toward or away from each other by said shaft regardless of the throttle setting. With this arrangement, therefore, the tractor may be steered regardless of the throttle setting and the speed of the tractor can be varied regardless of the setting of the steering mechanism.

As has been previously set forth, the speed governors 16 of the engines are normally set to hold the speeds of the engines below a predetermined value. Since the speed of the inside engine is reduced in making a turn and the maximum speed of the other engine is governed by the speed governor, the maximum power that can be obtained from the engines when the tractor in making a turn is less than the maximum that can be obtained in straight ahead driving.

It is often desirable to have obtainable more power in making a turn than can be obtained with the engines running under control of their governors. Consequently, means associated with the steering and throttle mechanisms and automatically operable thereby are provided to automatically disable one or the other of the speed governors of the engines when the tractor is making a turn. Said mechanism includes arms 110, 112 fixed to the shafts 76 and 78, respectively. Links 114 and 116 are pivoted to said arms and are extended forwardly thereof to the engines and have turn buckles 118 intermediate their ends by which the lengths of said links can be adjusted. The forward end of each link is provided with a member 120 having a longitudinally elongated slot 122 therein. The governor of each engine has a bell crank lever 126 that is pivoted on a shaft 128 and has a pin 124 received loosely in each slot 122. The lower arms of said bell crank levers are disposed above and are normally free from engagement with pins 130 of the speed governors which pins operate, when held in a depressed position, to disable the governors, or to permit the maximum speed of the engines to be increased over that provided by the normal setting of the governors. When the rod 114, or the rod 116, is moved rearwardly, or in a direction that corresponds with the movement of the throttle rods 82 and 88, to slow down the engine, such movement will not effect the depressing of the pins 130. When, however, either of said rods 114 or 116 is moved forwardly a suitable distance, the pins will be depressed and the governors disabled. The rods 114 and 116 move simultaneously with and in the same direction as the throttle links 82 and 88 so that the speed governor of the engine which is speeded up, or the engine on the outside of the turn, is disabled so that its speed can be increased.

The particular throttle setting at which the speed governors will be disabled can be regulated by the turn buckles 118.

Means are provided to hold the steering shaft in a neutral position for straight-ahead driving which means, however, is not essential to this invention. Said means comprises a grooved segment 132 carried by the shaft 18 beneath the steering wheel 28. Flexible cables 134 and 136 are fixed to said segment and are located in the grooves therein and are under the tension of springs 138. The strength of the springs is sufficient to hold the steering shaft in a neutral position. The amount of rotation of the steering shaft is limited by a screw 140 which is fixed to said shaft and is loosely extended through an arcuate slot 142 in the bracket 102. The engagement of said screw with the opposite end walls of the slot thus limits the degree of angular movement of the steering shaft.

I claim:

1. Steering mechanism for twin engine tractors comprising throttle operating members each independently associated with a separate engine and both arranged to move in the same direction to control their respective engines in the same sense, a steering shaft rotatable in opposite directions, and members having independent reversely screw threaded driving connections with said shaft and movable respectively toward and away from each other on opposite movements of said shaft and having operative connections with said throttle operating members whereby a rotation of the shaft in one direction advances one and simultaneously retards the other throttle operating member.

2. Steering mechanism for twin engine tractors comprising engine throttle members each independently associated with a separate engine and both arranged to move in the same direction to control their respective engines in the same sense a steering shaft rotatable in opposite directions, said shaft having right and left hand screw threads, nuts engaged with and operated by said right and left hand screw threads, said nuts being movable respectively toward and away from each other on opposite movements of said shaft and having separate operative connections with said engine throttle members whereby a rotation of said shaft in one direction advances one and simultaneously retards the other throttle member.

3. Steering mechanism for twin engine tractors comprising a steering shaft rotatable in opposite directions, said shaft having right and left hand screw threads, nuts engaged with said screw threads, and movable thereby toward and away from each other, means guiding said nuts for movement axially of said shaft while maintaining said nuts against rotation including a shaft which is parallel with said steering shaft and has a longitudinally extended groove in the periphery thereof, said nuts having projections which are slidable lengthwise of said groove, and engine throttle members connected with said nuts.

4. Steering mechanism for twin engine tractors comprising a splined steering shaft, a pair of right and left handed screw threaded members slidable on the splines of said shaft, means connecting said screw threaded members for conjoint sliding movement, nuts engaged with said screw threaded members, and engine throttle members operated by said nuts.

5. Steering mechanism for twin engine tractors comprising a splined steering shaft, a pair of right and left handed screw threaded members slidable on the splines of said shaft, means connecting said screw threaded members for conjoint sliding movement, a throttle arm connected with said connecting means arranged to slide said screw threaded members axially of said shaft, nuts engaged with said screw threaded members, and throttle members operated by said nuts.

6. Steering mechanism for twin engine tractors, comprising a splined steering shaft, a pair of right and left handed screw threaded members slidable on the splines of said shaft, a collar connecting said screw threaded members for conjoint sliding movement, a fixed guide shaft extended in parallel relation with said steering shaft, said collar having a sliding engagement with said guide shaft which holds said collar against rotary movement, a throttle lever for moving said collar and said screw threaded members axially of said shaft, nuts engaged with said screw threaded members and having sliding connections with said guiding shaft, and throttle members operated by said nuts.

7. Combined steering and throttle mechanism for twin engine tractors comprising a steering shaft having right and left handed screw threads, nuts engaged with said screw threads and movable toward and away from each other by said screw threads, means whereby said nuts can be moved in the same direction simultaneously axially of said shaft, throttle members operated by said nuts, throttle mechanism, and means connecting said throttle mechanism with said throttle members for moving said nuts both in the same direction.

8. In steering mechanism for twin engine tractors wherein each engine has a throttle member and an overspeed governor, a steering member having connections with said throttle members by which to slow down one engine and speed up the other engine, and also having connections with said overspeed governors arranged to disable the overspeed governor associated with the engine that is speeded up, means by which said throttle members can be moved in the same direction independently of their connections with said steering member, and throttle mechanism associated with said steering mechanism having connections with said throttle members to move them both in the same direction and also having means to control the disabling of said governors.

9. The combination, in a tractor, of twin engines each having a throttle member and an over-speed governor provided with a disabling member, and steering mechanism for the tractor including a steering member having means connecting it with said throttle members arranged to move said throttle members in opposite directions, and also having means conecting it with each of said disabling members arranged to disable said overspeed governors only after said throttle members have been opened a predetermined amount, and throttle mechanism having connections with said throttle members and also with said lost motion connecting means arranged to move both of said throttle members and said lost motion connection means in the same direction independently of the operaiton of said steering member.

In testimony whereof, I have signed my name to this specification.

ORRIS A. HARKNESS.